(12) United States Patent
Hama et al.

(10) Patent No.: US 6,239,423 B1
(45) Date of Patent: May 29, 2001

(54) AREA SENSOR WITH OPTICAL AXIS HAVING NARROW ANGULAR CHARACTERISTICS

(75) Inventors: Kiyoshi Hama; Keisuke Murakami, both of Osaka (JP)

(73) Assignee: Keyence Corporation, Okasa (JP)

( * ) Notice: Subject to any disclaimer, the term of this patent is extended or adjusted under 35 U.S.C. 154(b) by 0 days.

(21) Appl. No.: 09/328,373

(22) Filed: Jun. 9, 1999

(30) Foreign Application Priority Data

Jun. 10, 1998 (JP) .................................................. 10-162503

(51) Int. Cl.⁷ ...................................................... G01V 8/20
(52) U.S. Cl. ........................ 250/221; 250/222.1; 340/556
(58) Field of Search ................................ 250/221, 222.1, 250/208.4, 208.2, 216; 340/541, 545.3, 552, 555, 556, 557

(56) References Cited

U.S. PATENT DOCUMENTS

| | | | |
|---|---|---|---|
| 5,198,661 | * | 3/1993 | Anderson et al. .................... 250/221 |
| 5,281,809 | * | 1/1994 | Anderson et al. .................... 250/221 |
| 5,302,942 | * | 4/1994 | Blau ....................................... 340/556 |
| 5,334,972 | | 8/1994 | Sugimoto et al. .................... 340/556 |
| 5,393,973 | | 2/1995 | Blau ....................................... 250/221 |
| 5,461,227 | * | 10/1995 | Blau ....................................... 250/221 |

FOREIGN PATENT DOCUMENTS

| | | | |
|---|---|---|---|
| 0 562 726 A1 | 9/1993 | (EP) | ................................ F16P/3/14 |
| 0 598 630 A1 | 5/1994 | (EP) | ................................ F16P/3/14 |
| 0 889 332 A1 | 1/1999 | (EP) | ................................ G01V/8/20 |

* cited by examiner

Primary Examiner—John R. Lee
(74) Attorney, Agent, or Firm—Morgan, Lewis & Bockius LLP

(57) ABSTRACT

An area sensor including a light emitter having a plurality of light emitting devices that emit rays of light and a light receiver having light receiving devices that respectively correspond to the light emitting devices for receiving the rays of light therefrom. In the area sensor, the light emitting device and/or the light receiving device that provides at least one of the optical axes formed by sets of the light emitting devices and the corresponding light receiving devices is adapted to have narrower angular characteristics than the light emitting devices and/or the light receiving devices that provide the other optical axes.

15 Claims, 13 Drawing Sheets

FIG. 9 (a)
PRIOR ART
FIG. 9 (b)
PRIOR ART
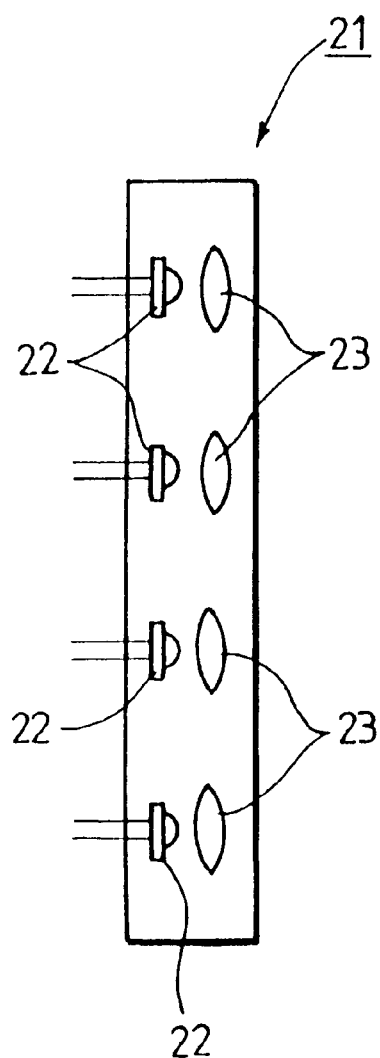
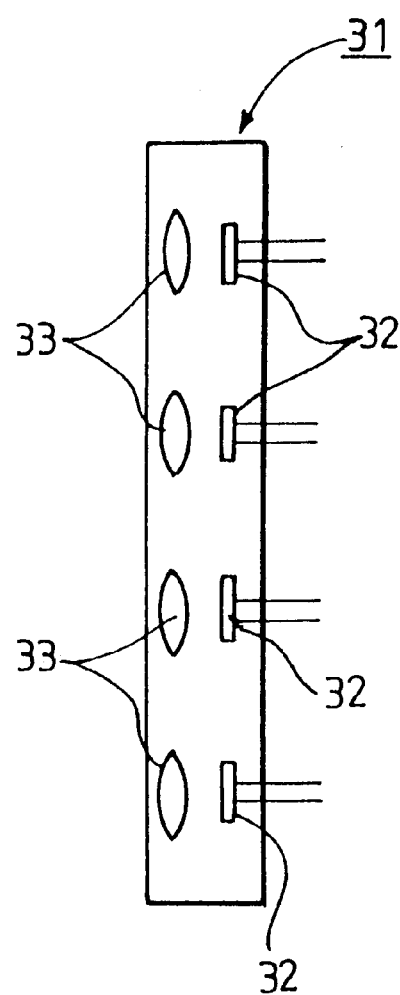

AREA SENSOR WITH OPTICAL AXIS HAVING NARROW ANGULAR CHARACTERISTICS

BACKGROUND OF THE INVENTION

1. Field of the Invention

The present invention relates to an area sensor having a light emitter and a light receiver that have a plurality of optical axes provided with in a detection area, each optical axis connecting a set of a light emitting device and a light receiving device. In particular, the invention relates to an area sensor that permits correct matching of optical axes during installation.

2. Description of the Related Art

An area sensor is a kind of switch that comprises a light emitter including light emitting devices and a light receiver including light receiving devices, a set of one light emitting device and one light receiving device forming an optical axis. If any one of the optical axes is interrupted by a moving object, the area sensor turns on. Having a wide area within which the presence or absence of an object can be detected, the area sensor ensures the safety of the operators of machine tools, punching machines, pressing machines, brakes, molding machines, automatic controllers, winding machines, robots, casting machines and the like. In the case of a pressing machine, the area sensor is positioned in a dangerous zone of the machine which is the detection area and when fingers or any other part of the operator's body enters the detection area and interrupts a particular optical axis, the sensor detects that phenomenon and takes an immediate protective action by shutting down the machine or issuing an alarm.

The area sensor is also used in an automatic production line of a plant, where it detects the presence or absence of a moving article and signals for a transfer to the next step upon detecting the article. In this case, the area sensor works as a sensor for automatic control.

An area sensor of this type is shown in FIG. 8 and it comprises a light emitter 2 in which a plurality of light emitting devices 21 such as light emitting diodes (LEDs) that emit infrared rays or the like are spaced on a specified pitch (in FIG. 8, four light emitting devices are provided) and a light receiver 3 in which a corresponding number of light receiving devices 31 such as phototransistors that are spaced on a specified pitch in correspondence with the light emitting devices 21 so that they receive infrared beams 5 emitted from the light emitting devices 21 in the light emitter 2. The light emitter 2 and the light receiver 3 are provided in a face-to-face relationship such that the emitter 2 is positioned on one side of the detection area where the operator of a pressing machine or the like must be protected whereas the receiver 3 is positioned on the other side of the detection area. Optical beams issued from the light emitting devices 21 in the light emitter 2 travel to the corresponding light receiving devices 31 in the light receiver 3.

A specific configuration of the conventional light emitting devices 21 in the light emitter 2 shown in FIG. 8 and a specific configuration of the conventional light receiving devices 31 in the light receiver 3 also shown in FIG. 8 will now be described with reference to FIGS. 9(a) and 9(b), respectively. As shown in FIG. 9(a), each light emitting device 21 is composed of a light emitting diode 22 and a light emitting lens 23 through which the infrared light from the light emitting diode 22 is emitted as infrared beams in a desired pattern of luminous intensity distribution. In the conventional light emitter 2, the light emitting diodes 22 (which are four in number in FIG. 9(a)) all have identical characteristics. Similarly, the light emitting lenses 23 (which are four in number in FIG. (9)) all have identical characteristics.

As shown in FIG. 9(b), each light receiving device 31 is composed of a light receiving lens 33 that receives and collects the infrared beams emitted from the corresponding light emitting device 21 and a phototransistor 32 that issues an electrical signal upon receiving the collected infrared beams from the lens 33. In the conventional light receiver 3, the phototransistors 32 (which are four in number in FIG. 9(b) all have identical characteristics. Similarly, the light receiving lenses 33 (which four in number in FIG. 9(b) all have identical characteristics. Therefore, the angular characteristics that permit detection are substantially the same with respect to all optical axes involved.

The term "angular characteristics" as used herein refers to a region which, as seen from the center of the lens in a light emitting device or a light receiving device, allows each device to emit or receive light. Since this region assumes a substantially conical shape having the vertex at the stated center, it is called "angular characteristics" with respect to an optical axis.

The light emitter 2 and the light receiver 3 are both controlled with respective built-in control circuits (not shown) such that the emission of light from the light emitting devices 21 in the light emitter 2 and its reception by the corresponding light receiving devices 31 satisfy a specified timed relationship.

In order to ensure that the entrance of an object into the detection area is detected positively, the light emitter 2 and the light receiver 3 must be installed in such a way that the optical axis of each light emitting device 21 matches the optical axis of the corresponding light receiving device 31. To check for any mismatch, an indicator 6 is provided on the side of the light receiver as shown in FIG. 8. If any one of the optical axes is interrupted, the indicator 6 signals in red and only if all optical axes travel unblocked, does the indicator signal in green. Therefore, when an engineer is to install the area sensor, he only has to keep an eye on the indicator 6 while moving the light emitter (or light receiver) relative to the light receiver (or light emitter) and fixes the sensor in the position at which the red signal from the indicator 6 turns green.

FIG. 10(a) illustrates the ideal state of sensor installation in which all optical axes of the light emitter 2 align with those of the light receiver 3 as seen in a direction normal to the plane in which the optical axes lie. In FIG. 10(a), reference numeral 2 designates the light emitter, 3 designates the light receiver, 5 designates infrared beams having specified angular characteristics, and the area delineated by dashed lines indicates a detectable angular range. Suppose here that a light interrupting object 9 (see FIG. 10(b)) such as fingers or some other part of the human body gets into the detection area of the sensor that has been installed in the ideal state shown in FIG. 10(a). Then, the infrared beams 5 striking the object 9 are interrupted and no longer received by the corresponding light receiving device 31 in the light receiver 3, whereupon the light receiver 3 issues an alarm or shuts down the machine to ensure safety for the operator.

If the individual optical axes of the area sensor have wide angular characteristics as shown in FIG. 10(a), axial matching is easy to accomplish during sensor installation and, hence, convenience in use is assured.

However, in this case, even if the optical axes in the light emitter 2 in the installed sensor and those in the light receiver 3 are optically offset in a horizontal plane, the wide angular characteristics of the optical axes are problematic in that the light receiver 3 receives the light from the light emitter 2 and operates normally; as a result, the engineer installing the sensor fails to recognize the axial offset during the matching operation and ends up with installing and fixing the area sensor in the incorrect position. If an external reflector exists in a nearby area, the above-described phenomenon will induce a dangerous situation.

FIGS. 11(a) and 11(b) illustrate how such a dangerous situation occurs. FIG. 11(a) illustrates a case of sensor installation in which the optical axes of the light emitter 2 are offset from the optical axes of the light receiver 3, as seen in a direction normal to the plane in which the optical axes lie. In FIG. 11(a), reference numeral 2 designates the light emitter, 3 designates the light receiver, 5 designates infrared beams having specified angular characteristics, 8 designates an object having a reflecting surface or a specular surfaced body such as a mirror, and the area delineated by dashed lines indicates a detectable angular range. In the case shown in FIG. 11(a), the optical axes of the light emitter 2 are offset from the optical axes of the light receiver 3 and yet the light receiver 3 receives part of the light from the emitter 2 and operates normally; as a result, the engineer has installed the area sensor in the inappropriate position believing that the matching of optical axes is satisfactory.

However, if the specular surfaced body 8 happens to exist within the detectable angular range (normal operating range) as shown in FIG. 11(b), a portion of the infrared beams 5 travels unblocked by an interrupting object 9 and is reflected by the specular surfaced body 8 as indicated by an arrow 56 so that it is eventually received by the light receiver 3 in the corresponding position. As a result, the area sensor is most likely to operate erroneously by failing to issue an alarm or shut down the machine and this can be a very dangerous situation.

An obvious solution to this problem is narrowing the angular characteristics of all optical axes in the devices of interest. However, due to structural and manufacturing variations, this approach may potentially cause the problem that the angular range over which detection can be made with the area sensor taken as a whole becomes unduly narrow. In particular, the variations that result from the use of many optical axes are unavoidably greater than in the opposite case and it is quite cumbersome to ensure that the optical axes in the light emitter are in alignment with those in the light receiver; what is more, difficulty is involved in matching the individual optical axes during sensor installation and, hence, convenience in use is not insured.

An area sensor is known that has solved the aforementioned problem. The concept of the solution is to slightly offset the individual axes in both vertical and horizontal directions so as to form a narrow infrared beam for each set of a light emitting device and a light receiving device. However, compared to the method of arranging optical axes in a straight center line, offsetting them two-dimensionally is a very cumbersome operation and increases the manufacturing cost.

SUMMARY OF THE INVENTION

The present invention has been accomplished with a view to solving the aforementioned problems of the conventional area sensor and has an object providing an area sensor that does not have an unduly narrow overall detectable angular range, that has a smaller likelihood for erroneous operations due to optical axis mismatch between the light emitter and the light receiver and that yet can be manufactured without involving any cumbersome operations.

In order to achieve the above object, according to an aspect of the invention, there is provided an area sensor comprising: a light emitter having a plurality of light emitting devices that emit rays of light; and a light receiver having light receiving devices that respectively correspond to the light emitting devices for receiving the rays of light therefrom, wherein the light emitting device and/or the light receiving device that provides at least one of optical axes formed by sets of the light emitting devices and the light receiving devices corresponding thereto is adapted to have narrower angular characteristics than the light emitting devices and/or the light receiving devices that provide the other optical axes.

According to another aspect of the invention, there is provided an area sensor comprising: a light emitter having a plurality of light emitting diodes; and a light receiver having optoelectronic semiconductor light receiving devices that respectively correspond to the light emitting diodes for receiving rays of light therefrom, wherein the light emitting diodes and/or the optoelectronic semiconductor light receiving devices have such optical characteristics as to produce elliptical beam spots and the light emitting diode and/or the optoelectronic semiconductor light receiving device that provides at least one of optical axes formed by sets of the light emitting diodes and the optoelectronic semiconductor light receiving devices corresponding thereto is adapted to be such that a major axis of the elliptical beam spot produced with the light emitting diode and/or the optoelectronic semiconductor light receiving device is aligned with a direction in which the optical axes are arranged in a row whereas the light emitting diodes and/or the optoelectronic semiconductor light receiving devices that provide the other optical axes are adapted to be such that minor axes of the elliptical beam spots produced with the light emitting diodes and/or the optoelectronic semiconductor light receiving devices are aligned with the direction in which the optical axes are arranged in a row.

BRIEF DESCRIPTION OF THE DRAWINGS

FIGS. 9(a) and 9(b) are diagrams showing specific configurations of a light emitting device and a light receiving device shown in FIG. 8;

DETAILED DESCRIPTION OF THE PREFERRED EMBODIMENTS

The first embodiment of the invention will now be described with reference to FIGS. 1 to 5.

Figure 1:
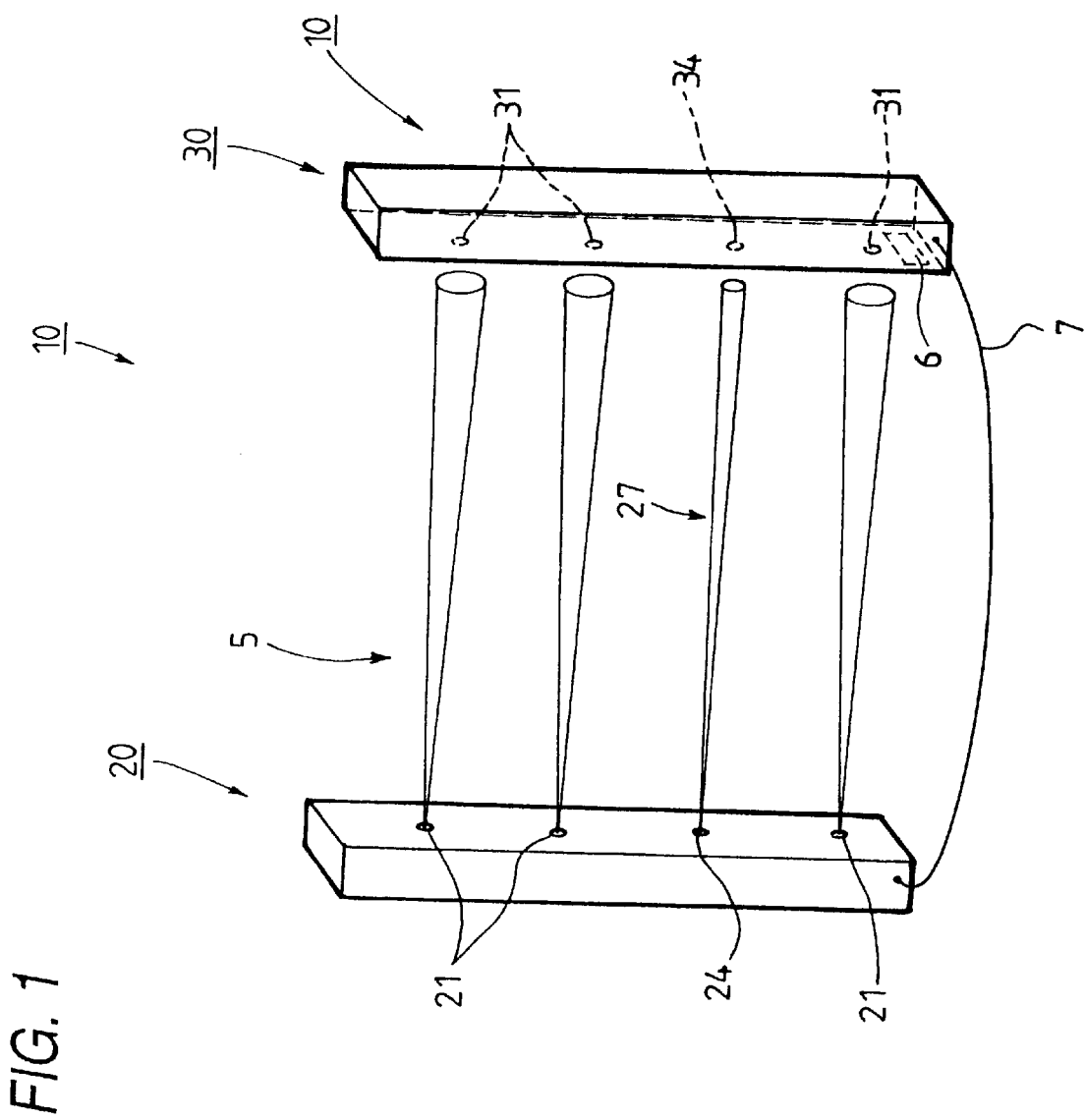
FIG. 1 is an overall perspective view of an area sensor according to a first embodiment of the invention.

FIG. 1 is an overall perspective view of an area sensor 10 according to the first embodiment of the invention. A light emitter 20 comprises a plurality (three in FIG. 1) of light emitting devices 21 such as light emitting diodes (LEDs) that emit infrared rays and one narrow-characteristics light emitting device 24 to be described later in this specification and which also emits infrared rays. The light emitting devices 21 and 24 are spaced on a specified pitch. A light receiver 30 comprises light receiving devices 31 such as phototransistors that are spaced in correspondence with the light emitting devices 21 in the light emitter 20 so that they receive infrared beams 5 emitted from those light emitting devices, and one narrow-characteristics light receiving device 34 to be described later in this specification and which is placed in correspondence with the narrow-characteristics light emitting device 24 so as to receive the infrared beam 27 emitted from that narrow-characteristic light receiving device 24.

The light emitter 20 and the light receiver 30 are both controlled with respective built-in control circuits (designated by 41 and 42 in FIG. 2) such that sync signals are transferred between the light emitter 20 and the light receiver 30 via a signal line 7. If desired, the two control circuits may be contained in a common controller which is connected to both the light emitter 20 and the light receiver 30 via connection cables. In the case shown in FIG. 1, the emission of light from the light emitting devices 21 and 24 in the light emitter 20 and its reception by the corresponding light receiving devices 31 and 34 in the light receiver 30 satisfy a specified timed relationship in accordance with the control by the built-in control circuits. Thus, the area sensor 10 has the light emitter 20 and the light receiver 30 provided in a face-to-face relationship such that the emitter 20 is positioned on one side of the detection area where the operator of a pressing machine or the like must be protected whereas the light receiver 30 is positioned on the other side of the detection area. Optical beams issued from the light emitting devices 21 and 24 in the light emitter 20 travel to the corresponding light receiving devices 31 and 34 in the light receiver 30.

Figure 2:
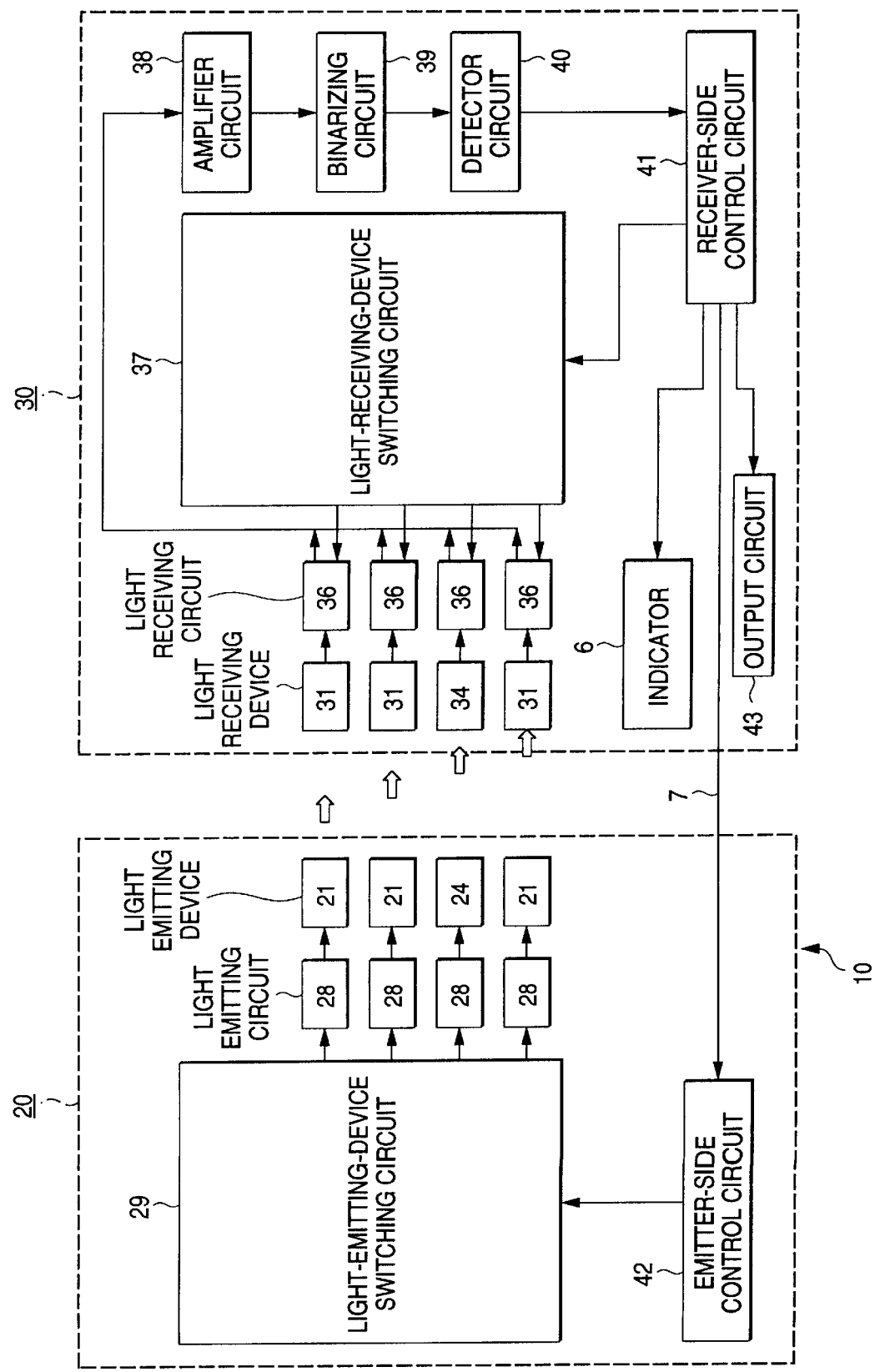
FIG. 2 is a block diagram for the area sensor shown in FIG. 1.
Figure 3:
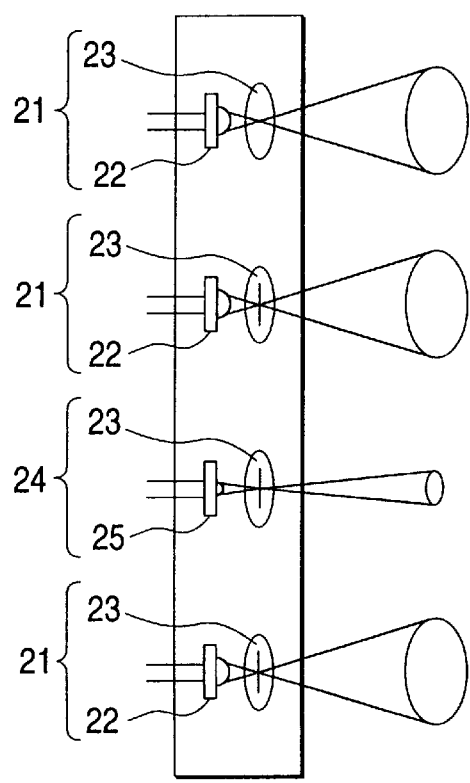
FIGS. 3 (a) and 3(b) are diagrams showing specific configurations of a light emitting device and a light receiving device shown in FIG. 2.
Figure 3:
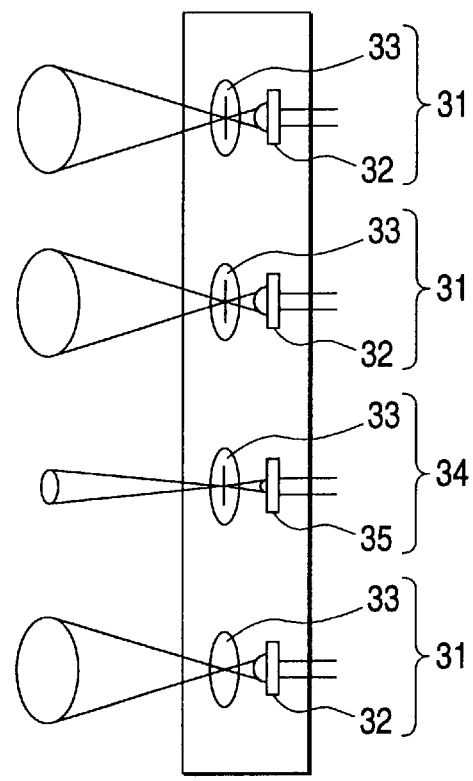

FIG. 2 is a block diagram of the area sensor 10 according to the first embodiment of the invention. As mentioned above, the area sensor 10 comprises the light emitter 20 and the light receiver 30. The light emitter 20 comprises a desired number of light emitting diodes or the like (which make up four in the first embodiment and consist of three light emitting devices 21 and one narrow-characteristics light emitting device 24) that are spaced on a specified pitch, for example, 4 cm, light emitting circuits 28 that drive the light emitting devices 21 and 24, respectively, a light-emitting-device switching circuit 29 that scans the light emitting circuits 28 on a time-sharing basis, and an emitter-side control circuit 42 that controls the system components of the light emitter.

The light receiver 30 comprises a desired number of phototransistors or the like that are light receiving devices 31 and one narrow-characteristics light receiving device 34 which are spaced on the same pitch as the light emitting devices in the light emitter 20, light receiving circuits 36 for performing I-V conversion on the light reception signals from the respective light receiving devices 31 and 34, a light-receiving-device switching circuit 37 that scans the light receiving devices on a time-sharing basis in synchronism with the corresponding light emitting devices 21 and 24 that pair with the respective light emitting circuits 28, and an indicator 6 signaling the status of the area sensor 10. The light receiver 30 further comprises an amplifier circuit 38 that amplifies light reception signals from the light receiving circuits 36 in response to signals from the light-receiving-device switching circuit 37, a binarizing circuit 39 that converts the amplified signals to either "1" or "0" depending upon a specified threshold, a detector circuit 40 that detects the binarized signals with reference to a threshold, a receiver-side control circuit 41 on the receptor side that controls the system components of the light receiver, and an output circuit 43 for signaling a pressing machine or the like to shut down. The indicator 6 may be a single indicator lamp that is lit in green when all optical axes are in alignment and which is otherwise lit in red. Alternatively, the indicator may be a monochromatic lamp that turns on when all optical axes are in alignment and which otherwise turns off. Although not shown, a light emitting/receiving monitor circuit is provided on each side of the light emitter and the light receiver to check at all times if each one of the light emitting devices and the light receiving devices is operating normally; if any abnormal event such as device failure occurs, the monitor circuits will give an alarm to the operator.

FIG. 3(a) shows an exemplary configuration of the light emitting devices 21 and 24 in the light emitter 20 shown in FIG. 2, and FIG. 3(b) shows an exemplary configuration of the light receiving devices 31 and 34 in the light receiver 30 also shown in FIG. 2. Each of the light emitting devices 21 is composed of a light emitting diode 22 that emits light in accordance with the control by the control circuit 42 and a light emitting lens 23 through which the infrared light from the light emitting diode 22 is emitted as infrared beams 5 in a desired pattern of luminous intensity distribution. The light emitter 20 is arranged such that the light emitting diodes 22 in the three light emitting devices 21 that are the first, second and fourth from the top of the array have identical angular characteristics (e.g., ±2.5 degrees) whereas the narrow-characteristics light emitting device 24 in the third position uses a light emitting diode 25 having a smaller emission diameter than the light emitting diodes 22 (hereinafter referred to as "narrow-emission light emitting diode 25"). Light emitting diodes on the market are available with emission diameters of 280 μm and 150 μm and those having an emission diameter of 280 μm are used as the light emitting diodes 22 whereas that having an emission diameter of 150 μm is used as the narrow-emission light emitting diode 25.

In the case shown in FIG. 3(a), all the light emitting lenses 23 have identical characteristics. With the configurations described above, the narrow-characteristics light emitting device 24 emits an infrared beam 27 having narrower angular characteristics than the infrared beams 5 from the other light emitting devices 21 (hereinafter referred to as "narrow infrared beam 27").

Each light receiving device 31 is composed of a light receiving lens 33 that receives and collects the infrared beams 5 emitted from the corresponding light emitting device 21 and a phototransistor 32 that issues an electrical signal upon receiving the collected infrared beams from the lens 33. Like the light-emitter 20, the light receiver 30 shown in FIG. 3(b) is arranged such that the phototransistors 32 in the three light receiving devices 31 that are the first, second and fourth from the top of the array have identical angular characteristics. The narrow-characteristics light receiving device 34 in the third position is composed of a light receiving lens 33 that receives and collects the narrow infrared beams 27 from the corresponding narrow-characteristics light emitting device 24 and a phototransistor 35 that issues an electrical signal upon receiving the collected infrared beams from the lens 33 and which has a smaller reception diameter than the phototransistor 32 (hereinafter referred to as "narrow-reception phototransistor 35"). In the case shown in FIG. 3(b), all the light receiving lenses 33 have identical angular characteristics. With the configurations described above, the narrow-characteristics light receiving device 34 permits light reception with narrower angular characteristics than the other light receiving devices 31.

Accordingly, the optical axes which are the first, second and fourth from the top of the array have substantially identical angular characteristics that permit detection whereas the optical axis which is in the third position has narrower angular characteristics for detection.

Having the configurations described above, the area sensor 10 operates in the following way. First, the light emitting devices 21 and 24 in the light emitter 20 are cyclically scanned to emit at specified intervals and, in synchronism with the emission timing, the light receiving circuits 36 in the light receiver 30 that pairs with the light emitter are cyclically turned on to perform scanned light reception, whereby only one set of a light-emitter and a light receiver is activated at any one time but the other sets remain inactive so that the interruption of any optical axis can be positively detected. When installing the area sensor 10 as the functional part of a safety device for a pressing machine or the like, the optical axes in the light emitter 20 have to be matched with those in the light receiver 30 by an engineer who keeps an eye on the indicator 6 on the light receiver 30 as he adjusts the relative positions of the light emitter 20 and the light receiver 30 until all optical axes are in alignment (as evidenced by the indicator 6 signaling in green), whereupon the engineer fixes the area sensor in the thus determined position.

Figure 4:
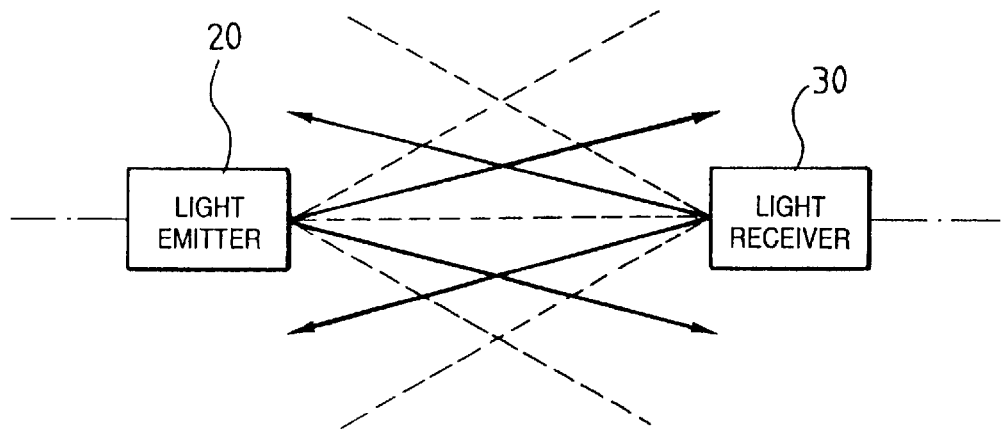
FIG. 4 is a diagram illustrating the ideal state of sensor installation in which optical axis alignment is achieved between a light emitter and a light receiver according to the invention.

FIG. 4 shows the ideal state of sensor installation in which all of the optical axes in the light emitter 20 are in alignment with those of the light receiver 30 as seen in a direction normal to the plane in which the optical axes lie. Reference numeral 20 designates the light emitter, 30 designates the light receiver, and the area delineated by dashed lines indicates the detectable angular range around the optical axis connecting the general-characteristics light emitting device 21 and the general-characteristics light receiving device 31. It should also be mentioned that the area delineated by solid lines indicates the detectable angular range around the optical axis connecting the narrow-characteristics light emitting device 24 and the narrow-characteristics light receiving device 34, both of which are deliberately provided in accordance with the invention.

Suppose here that a light interrupting object gets into the detection area of the sensor in the ideal state of installation. Then, the infrared beams striking the intruding object are interrupted and no longer received by the corresponding light receiving device 31 and/or the narrow-characteristics light receiving device 34, whereupon the light receiver 30 issues an alarm or shuts down the machine to ensure safety for the operator.

Figure 5:
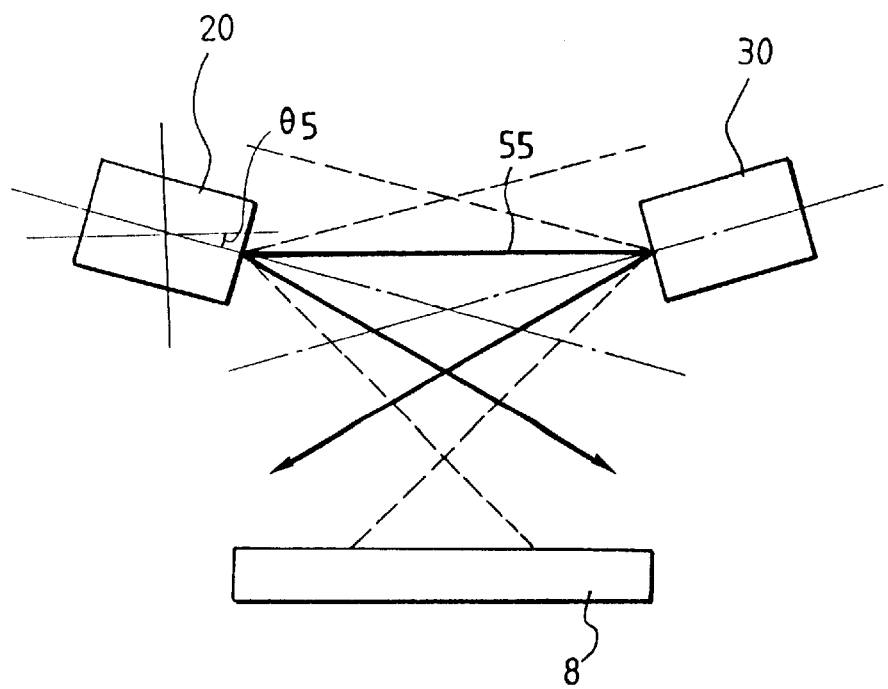
FIG. 5 is a diagram illustrating a case of sensor installation in which an optical axis misalignment occurs between a light emitter and a light receiver according to the invention.
Figure 11:
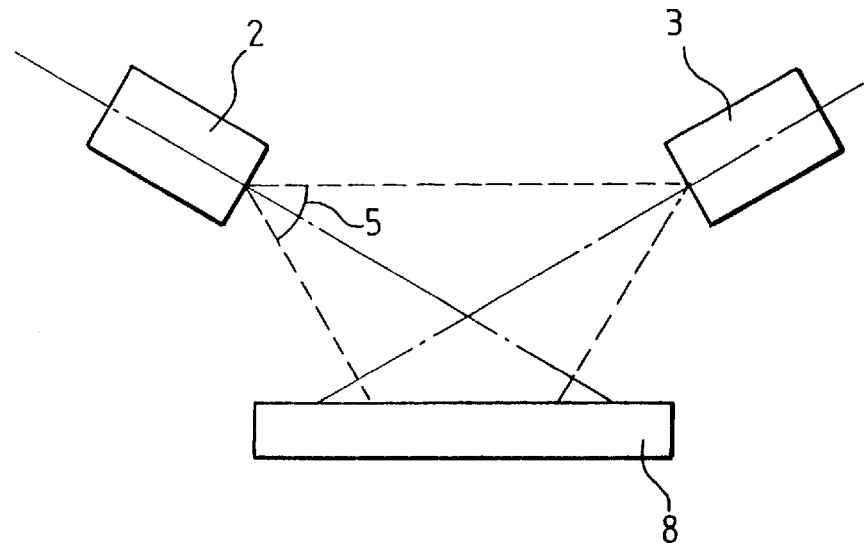
FIGS. 11(a) and 11(b) are diagrams illustrating a case of sensor installation in which an optical axis misalignment occurs between a light emitter and a light receiver in the conventional area sensor.
Figure 11:
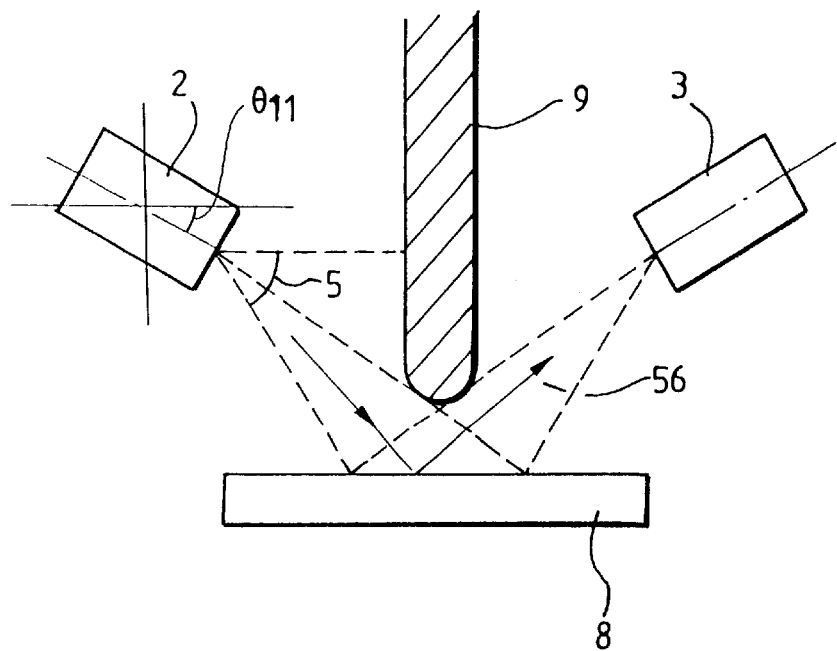

FIG. 5 illustrates a sensor installation in which the optical axis matching between the light emitter 20 and the light receiver 30 is not as ideal as in FIG. 4, as seen in a direction normal to the plane in which the optical axes lie. The dashed and solid lines in FIG. 5 have the same meanings as those in FIG. 4. FIG. 5 shows the critical position for the infrared beam 55 from the narrow-characteristics light emitting device 24 to be received by the corresponding narrow-characteristics light receiving device 34. If the area sensor is installed in such a way that the optical axes are offset on a horizontal plane by a greater angle than is dictated by the critical position, the optical axis 55 connecting the narrow-characteristics light emitting device 24 and the corresponding narrow-characteristics light receiving device 34, both being provided in accordance with the invention, is no longer detectable and the indicator 6 does not signal in green. Thus, in the embodiment under consideration, the optical axis with narrow angular characteristics that connects the narrow-characteristics light emitting device 24 and the corresponding narrow-characteristics light receiving device 34 is crucial to optical axis matching and a significant improvement in optical axis offset is achieved compared to the conventional case shown in FIGS. 11(a) and 11(b). In FIG. 5, the angle by which the light emitter 20 is offset from the horizontal line connecting the light emitter 20 and the light receiver 30 is indicated by $\theta 5$. The same angle of offset is indicated by $\theta 11$ in FIG. 11(b). Obviously, $\theta 5$ is smaller than $\theta 11$, so even if the specular surfaced body 8 is placed at the same position in both FIGS. 5, 11(a) and 11(b), all rays of light that are reflected from the specular surfaced body 8 in FIG. 5 are directed to go outside the range of detection with the light receiver, which hence will not make any erroneous detection, thereby preventing the area sensor 10 from making wrong operations. Therefore, the area sensor is convenient to use and has a smaller possibility for wrong operations due to the light reflection from a nearby specular surfaced area, thereby ensuring a higher degree of safety when the sensor is used as a safety device for a pressing machine or the like.

In the first embodiment described above, the optical axis which is the third from the top of the array is designed to have narrow angular characteristics but this is not the sole case of the invention and it goes without saying that the optical axis in any desired position in the array may have narrow angular characteristics.

In the first embodiment, only one optical axis is designed to have narrow angular characteristics but this is not the sole case of the invention and more than one optical axis may have narrow angular characteristics.

Figure 12:
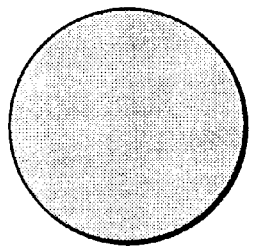
FIGS. 12(a) and 12(b) are diagrams showing the beam spots produced from light emitting diodes the emission characteristics of which are such as to produce circular and elliptical beam spots.
Figure 12:
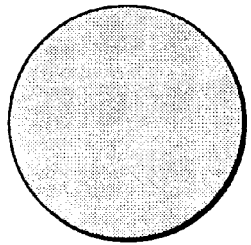
Figure 12:
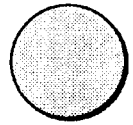
Figure 12:
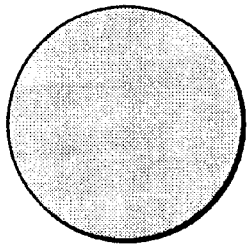
Figure 12:
Figure 12:
Figure 12:
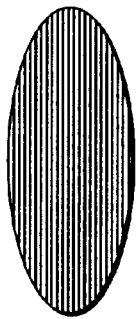
Figure 12:

The foregoing description assumes that an optical axis having narrow angular characteristics is provided by using a light emitting diode having a smaller emission diameter than other light emitting diodes but this is not the only method that can be used in the invention to produce the desired optical axis. The light emitting diodes used in the first embodiment have such optical characteristics that they produce circular beam spots as shown in FIG. 12(a). FIGS. 12(a) and 12(b) show light distribution patterns that are produced when infrared beams from light emitting diodes are received by a light receiving plane normal to the infrared beams. FIG. 12(a) shows circular patterns of light distribution and the circular beam spot produced with the light emitting diode that is the third from the top is shown to have a smaller radius (narrower angular characteristics) than the circular beam spots produced with the other light emitting diodes (that are the first, second and fourth from the top). Using this light emitting diode which is the third from the top, an optical axis can be created that has narrow angular characteristics in a transverse direction (from left to right in FIG. 12(a)). To this end, two types of light emitting diode (having different emission diameters) have to be employed.

However, light emitting diodes that produce circular beam spots as shown in FIG. 12(a) are not the only types that can be used in the invention and those which produce elliptical beam spots as shown in FIG. 12(b) are also available for use in the invention. If one of such light emitting diodes, for example, the one that is the third from the top is adapted to be such that the major axis of the elliptical beam spot produced with that light emitting diode is aligned with the direction in which optical axes are arranged in a row as seen in FIG. 12(b), an optical axis can be created that has narrow angular characteristics in a transverse direction (from left to right in FIG. 12(b)). The other light emitting diodes are adapted to be such that the minor axes of the elliptical beam spots produced with those diodes are aligned with the direction in which optical axes are arranged in a row as seen in FIG. 12(b). This configuration produces the same effect as can be attained in the case shown in FIG. 12(a).

In the case shown in FIG. 12(a), two types of light emitting diode have to be employed. on the other hand, only one type of device need be procured in the case shown in FIG. 12(b) and this offers a great benefit to manufacture.

The same discussion as set forth above applies to photodiodes and phototransistors. Using those types of available photodiodes and phototransistors which have elliptical optical characteristics, an optical axis having narrow angular characteristics can be created by aligning the major axis of an elliptical beam spot with the direction in which optical axes are arranged in a row whereas the minor axis of the elliptical beam spot is aligned with the horizontal direction.

The foregoing description assumes that the narrow-characteristics light emitting device 24 pairs with the narrow-characteristics light receiving device 34. However, this is not the sole case of the invention and an optical axis having narrow angular characteristics can be produced by providing a light emitting device 24 of considerably narrow characteristics in the light emitter 20 and by pairing it with a light receiving device 31 that does not have narrow characteristics but which is identical to any other light receiving devices in the light receiver 30.

Conversely, the light emitter 20 may be composed of light emitting devices 21 that do not have narrow characteristics but which are identical to one another whereas a light receiving device 34 of considerably narrow characteristics is used in the light receiver 30. Also in this case, an optical axis having narrow angular characteristics can eventually be produced.

In another modification, the narrow-characteristics light emitting device 24 may use a light emitting lens having a narrower luminous intensity distribution characteristic than the light emitting lenses in the other light emitting devices 21. This offers the advantage of not using the narrow-emission light emitting diode 25 and yet producing an optical axis of narrow angular characteristics using the light emitting diode 22 that does not have narrow characteristics.

Similarly, the narrow-characteristics light receiving device 34 may use a light receiving lens having a narrower luminous intensity distribution characteristic than the light receiving lenses in the other light receiving devices 31. This offers the advantage of producing an optical axis of narrow angular characteristics replacing the narrow-reception phototransistor 35 by the phototransistor 21 that does not have narrow characteristics.

A lens having a narrower luminous intensity distribution characteristic can easily be realized by:

(1) changing the lens diameter, or
(2) changing the focal length.

Figure 14:
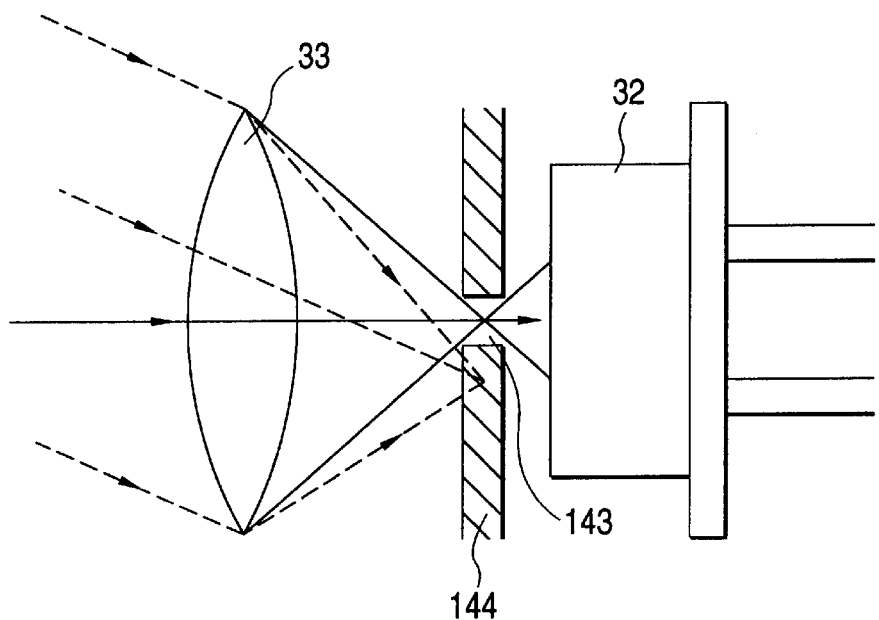
FIGS. 14(a) and 14(b) are diagrams illustrating another embodiment capable of creating an optical axis having narrow angular characteristics.
Figure 14:
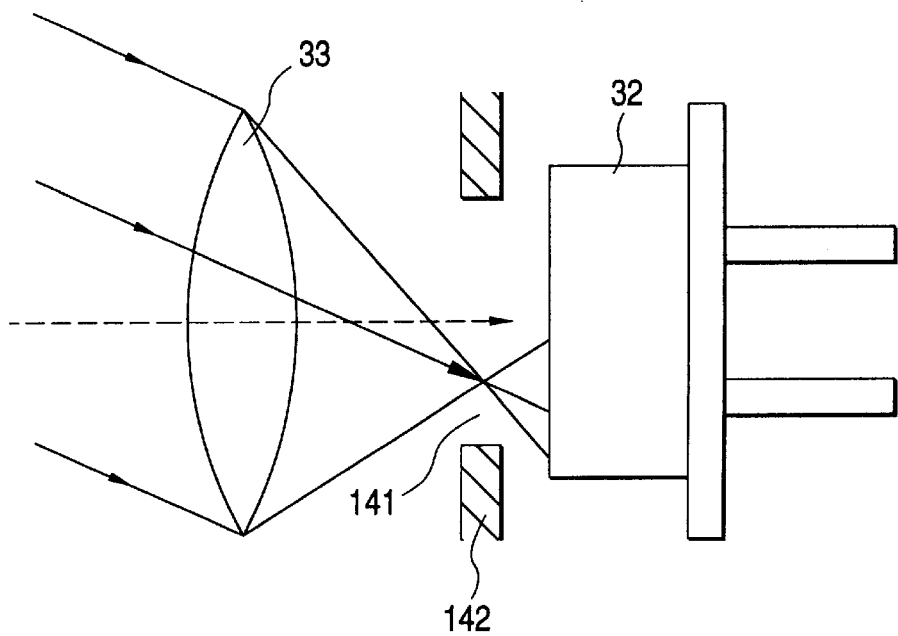

FIGS. 14(a) and 14(b) show yet another methods of creating an optical axis having narrow angular characteristics. As shown, different angular characteristics are produced by providing plates having slit holes of different diameters between a light receiving lens 33 and an optoelectronic semiconductor light receiving device 32. FIG. 14(a) shows the case of using a plate 144 having a slit hole 143 of the smaller diameter and FIG. 14(b) shows the case of using a plate 142 having a slit hole 141 of the larger diameter.

In the case shown in FIG. 14(a), rays of light that are parallel to the optical axis (as indicated by solid lines) are focused within the slit hole 143 and, hence, can be received by the optoelectronic semiconductor light receiving device 32; however, rays of light that are angularly offset from the optical axis (as indicated by dashed lines) are focused at a point outside the slit hole 143 and hence cut by the plate 144 before being received by the optoelectronic semiconductor light receiving device 32. Thus, only the rays of light that are substantially parallel to the optical axis are received by the optoelectronic semiconductor light receiving device 32 to create narrow angular characteristics.

On the other hand, in the case shown in FIG. 14(b) where the plate 142 has the slit hole 141 of the larger diameter, even the rays of light that are angularly offset from the optical axis (as indicated by solid lines) are focused within the slit hole 141 and can be received by the optoelectronic semiconductor light receiving device 32. Hence, wide angular characteristics are produced in the case shown in FIG. 14(b).

As will be understood from the above discussion, rays of light passing through the light receiving lens are allowed to converge at the position where the plate with a slit hole is provided and the width of the angular characteristics to be produced depends on whether the convergent rays pass through the slit hole or not. Therefore, the width of angular characteristics can be easily adjusted by changing the diameter of the slit hole in the plate interposed between the light receiving lens and the optoelectronic semiconductor light receiving device.

Figure 13:
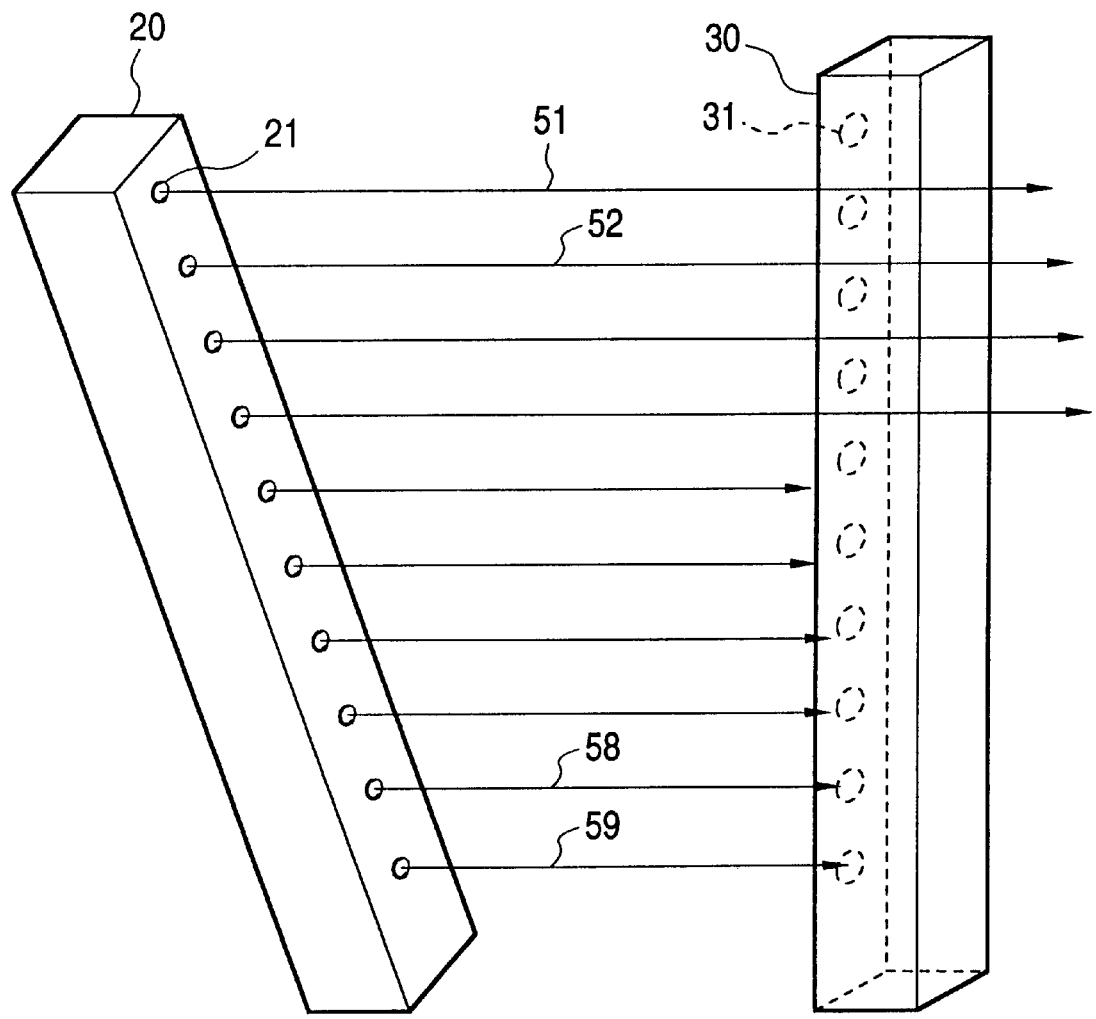
FIG. 13 is a diagram illustrating a mechanism for the occurrence of an optical offset that is different from that shown in FIGS. 11(a) and 11(b) and which involves the rotation of a light emitter and a light receiver as they are kept in parallel planes to each other.

In the foregoing description, optical offset is assumed to occur if the light emitting plane of the light emitter 20 is not positioned parallel to the light receiving plane of the light receiver 30. This is not the sole reason for the occurrence of optical offset and even if the light emitting plane of the light emitter 20 and the light receiving plane of the light receiver 30 are positioned to face parallel to each, optical offset can occur if either the light emitter 20 or the light receiver 30 is rotated through a certain angle while the light emitting plane and the light receiving plane remain parallel to each other as shown in FIG. 13. Even this type of optical offset can be corrected by using more than one optical axis having narrow angular characteristics according to the invention. More specifically, two optical axes having narrow angular characteristics according to the invention may be provided in remote positions as in the neighborhood of the top end of the array of optical axes (where the optical axis 51 or 52 is located in FIG. 13) and in the neighborhood of the bottom end (where the optical axis 58 or 59 is located). If, with this arrangement, either the light emitter 20 or the light receiver 30 is rotated through a certain angle while keeping the parallel relationship between the light emitting plane and the light receiving plane, the infrared beam (optical axis 51) from the light emitting device 21 at the topmost end is not received by the corresponding light receiving device 31 and the indicator does not signal in green. Hence, the engineer installing the area sensor changes the relative positions of the light emitter 20 and the light receiver 30 on a trial-and-error basis until he determines the positions where neither the light emitter nor the light receiver is rotated relative to each other. Thus, the light emitter 20 and the light receiver 30 can be fixed in such a way that the resulting area sensor will produce no optical offset.

On the other hand, if all optical axes are designed to have wide angular characteristics as in the conventional sensor, the positional relationship shown in FIG. 13 causes the infrared beam (optical axis 51) from the light emitting device 21 near the topmost and of the array to be received by the light receiving device 31 and the engineer installing the area sensor will end up with false matching of optical axes without correcting the optical offset.

The second embodiment of the present invention will now be described with reference to FIG. 6, which is a perspective view of an extendable area sensor furnished with an optical axis having narrow angular characteristics according to the invention. An "extendable area sensor" may be defined as follows: a base unit of light emitter 60 which is capable of working as a light emitter by itself and a base unit of light receiver 70 which is also capable of working as a light receiver by itself are connected by a communication line 7 to form a unit area sensor, of which the detection area can be increased by coupling a desired number of extension units of light emitter 61 to the base unit of light emitter 60 in its longitudinal direction and coupling a corresponding number of extension units of light receiver 71 to the base unit of light receiver 70 in its longitudinal direction.

To control an extendable area sensor, a maximum number of optical axes that are required for one scan period is determined at design stage, with the sensor being designed to be driven up to the determined maximum number of optical axes. Then, a common controller can be used without any modification irrespective of the number of added extension units if the maximum number of optical axes is not exceeded.

Figure 6:
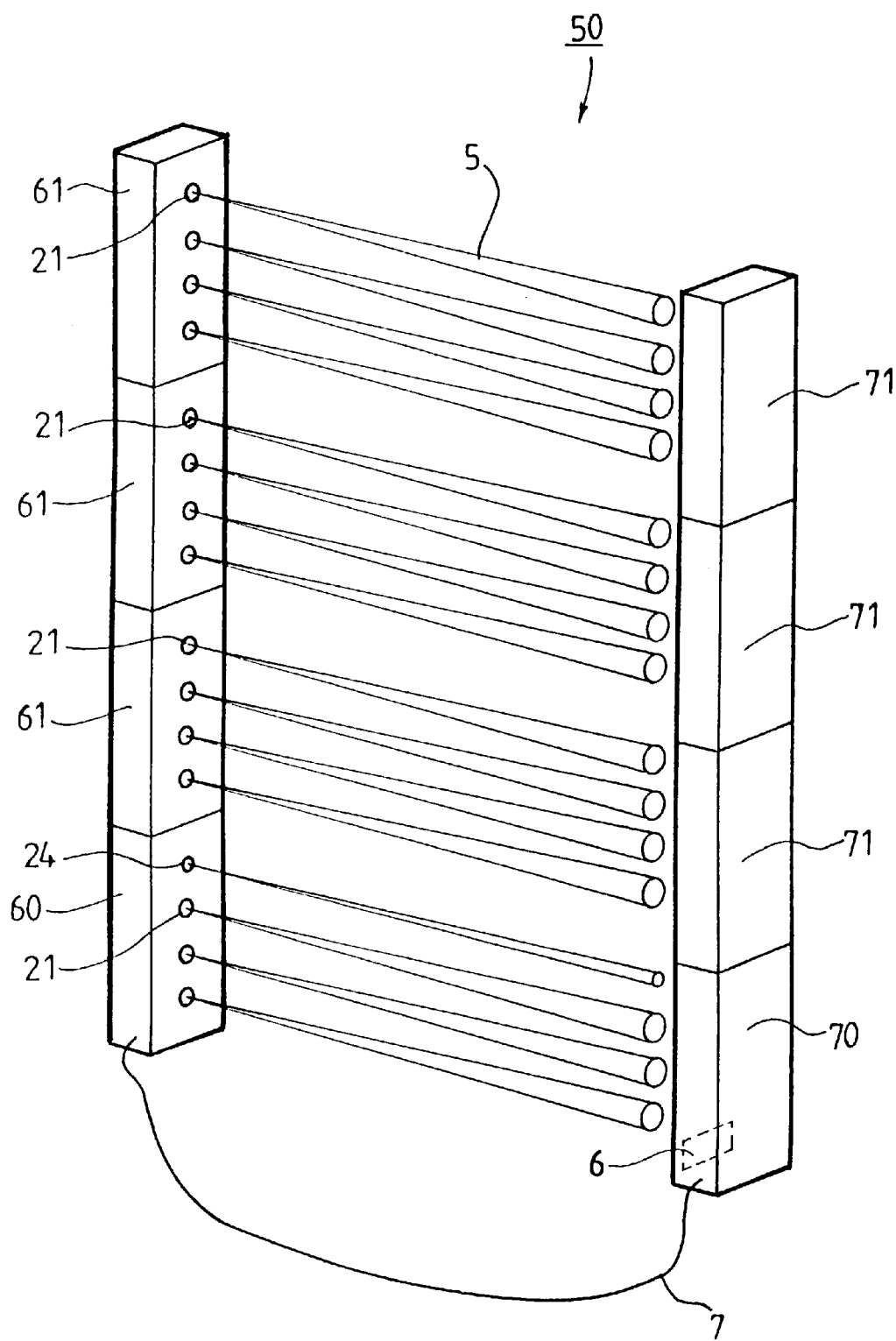
FIG. 6 is an overall perspective view of an area sensor according to a second embodiment of the invention.

In the embodiment shown in FIG. 6, a set of the base units of light emitter and light receiver, as well as a set of the extension units of light emitter and light receiver each have four optical axes. Since three extension units are coupled to one base unit, 16 optical axes in total are created in the second embodiment under consideration. The topmost optical axis in the base unit has narrow angular characteristics on account of the use of narrow-characteristics light emitting device 24. The light emitting devices providing the other optical axes in the base unit and all optical axes in the extension units have identical characteristics and are designated by reference numeral 21. As in the first embodiment, the light emitting devices 21 may have light-emitting diodes with an emission diameter of 280 μm whereas the narrow-characteristics light emitting device 24 may have a narrow-emission light emitting diode with an emission diameter of 150 μm.

The operation of the area sensor 50 according to the second embodiment of the invention is essentially the same as the area sensor 10 according to the first embodiment and need not be described here.

As in the area sensor 10 according to the first embodiment, the extendable area sensor 50 according to the second embodiment allows the optical axis of narrow angular characteristics from the narrow-characteristics light emitting device 24 to be in alignment with the optical axis of the corresponding light receiving device and this provides more correct matching of optical axes. On the other hand, the optical axes from the other light emitting devices have sufficiently wide angular characteristics that the matching operation can be accomplished without any difficulty. The extendable area sensor 50 is not only convenient to use but also less likely to operate erroneously, thereby ensuring greater safety for the operator when used as a safety device in a pressing machine or the like.

In the second embodiment described above, the topmost optical axis in the base unit of light emitter is adapted to have narrow angular characteristics but this is not the sole case of the invention and the optical axis in any desired position on the base unit may have narrow angular characteristics.

In a modified version of the second embodiment, all of the light emitting devices in the base unit of light emitter 60 may be identical (light emitting devices 21) whereas at least one of the light receiving devices in the base unit of light receiver 70 has narrow characteristics (narrow-characteristics light receiving device 34). This arrangement is also effective in creating an optical axis having narrow angular characteristics.

If each of the light emitting and light receiving devices has a lens, the discussion made in the previous paragraph also holds with the lenses.

Figure 7:
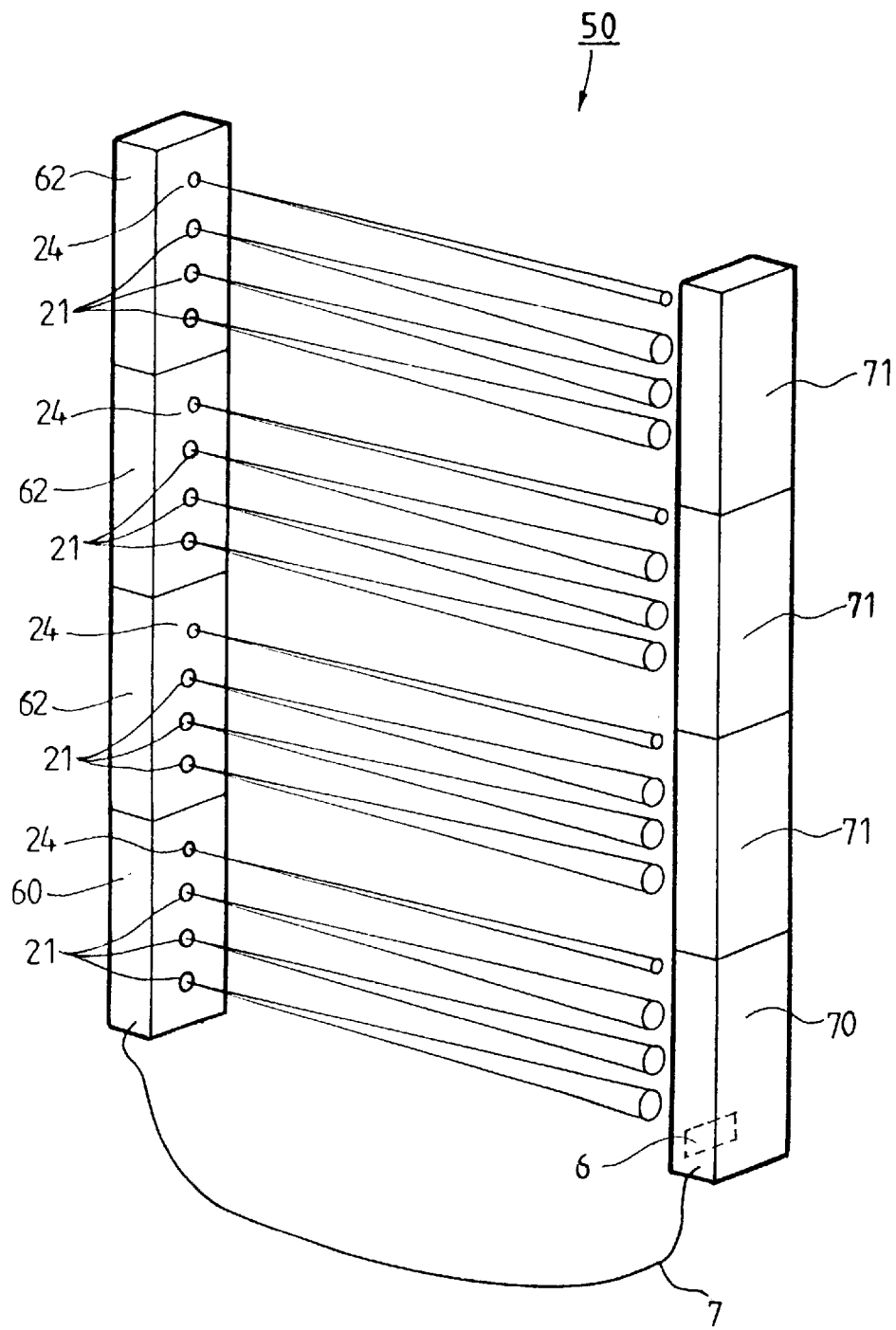
FIG. 7 is an overall perspective view of an area sensor according to a third embodiment of the invention.
Figure 8:
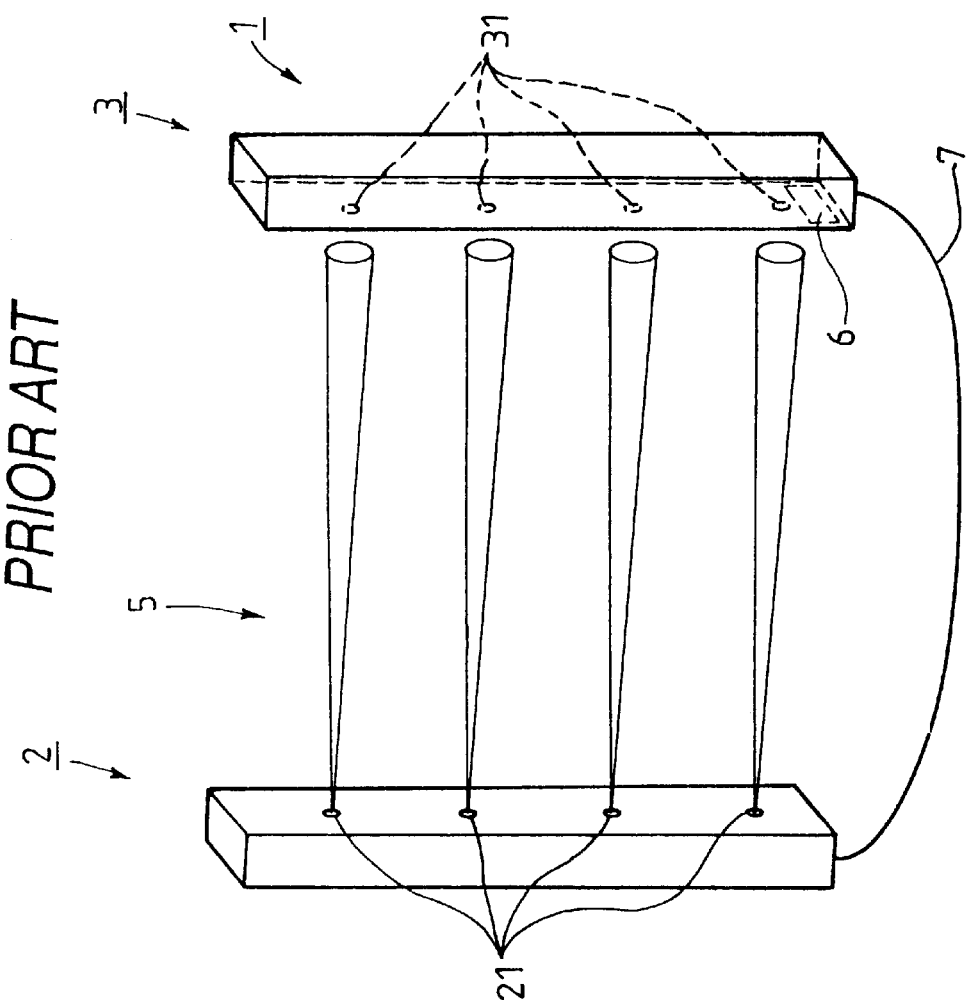
FIG. 8 is an overall perspective view of a conventional area sensor.
Figure 10:
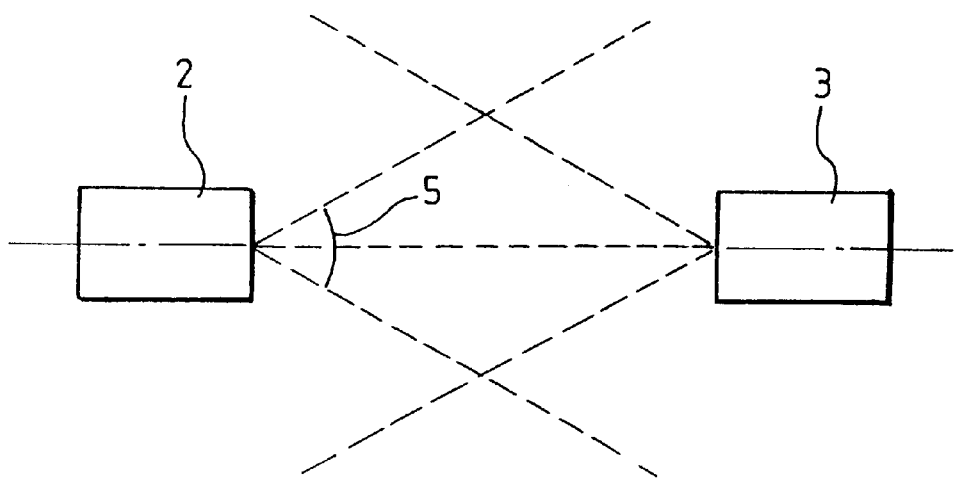
FIGS. 10(a) and 10(b) are diagram illustrating the ideal state of sensor installation in which optical axis alignment is achieved between a light emitter and a light receiver in the conventional area sensor.
Figure 10:
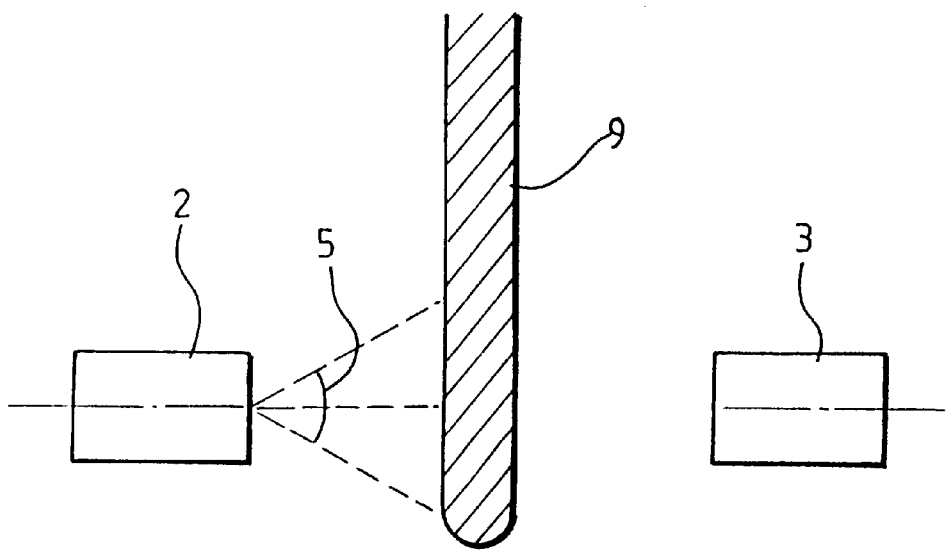

Next, the third embodiment of the invention will now be described with reference to FIG. 7 which is a perspective view of an extendable area sensor 50 that is furnished with a plurality of optical axes having narrow angular characteristics according to the invention. In the embodiment shown in FIG. 7, both the base unit and each extension unit have four optical axes. Since three extension units are coupled to one base unit, 16 optical axes in total are created in the third embodiment under consideration. The topmost optical axis in the base unit has narrow angular characteristics on account of the use of narrow-characteristics light emitting device 24 in the light emitter 60; in addition, the topmost optical axis in each extension unit has narrow angular characteristics on account of the use of narrow-characteristics light emitting device 24 in the light emitter 62. The light emitting devices providing the other optical axes in the base unit and each extension unit have identical characteristics and are designated by reference numeral 21. As in the second embodiment, the light emitting devices 21 may have light emitting diodes with an emission diameter of 280 μm whereas the narrow-characteristics light emitting devices 24 may have narrow-emission light emitting diodes with an emission diameter of 150 μm.

The operation of the area sensor 50 according to the third embodiment of the invention is also essentially the same as the area sensor 10 according to the first embodiment and need not be described here.

As in the area sensor 10 according to the first embodiment, the extendable area sensor 50 according to the third embodiment allows the optical axis of narrow angular characteristics from the narrow-characteristics light emitting device 24 to be in alignment with the optical axis of the corresponding light receiving device and this provides more correct matching of optical axes. On the other hand, the optical axes from the other light emitting devices have sufficiently wide angular characteristics that the matching operation can be accomplished without any difficulty. The extendable area sensor 50 is not only convenient to use but also less likely to operate erroneously, thereby ensuring greater safety for the operator when used as a safety device in a pressing machine or the like. As a further advantage, if an extension unit is added, more than one optical axis having narrow angular characteristics is provided so that even the optical offset resulting from the rotation of the light emitter and the light receiver as they are kept in parallel planes to each other can be eliminated to ensure the correct matching of optical axes. If the base unit and all extension units to be added are designed in such a way that an optical axis having narrow angular characteristics is provided in the same position on each unit, greater convenience is ensured because the area sensor can be extended without caring which unit of light emitter should pair with which unit of light receiver to ensure the desired optical axis alignment.

In the third embodiment described above, the topmost optical axis in each of the base unit and an extension unit is adapted to have narrow angular characteristics but this is not the sole case of the invention and the optical axis in any desired position on the base unit and an extension unit may have narrow angular characteristics.

In a modified version of the third embodiment, all of the light emitting devices in the base unit and an extension unit of light emitter 60 may be identical (light emitting devices 21) whereas at least one of the light receiving devices in the base unit and the extension unit of light receiver 70 has narrow characteristics (narrow-characteristics light receiving device 34). This arrangement is also effective in creating optical axes having narrow angular characteristics.

If each of the light emitting and light receiving devices has a lens, the discussion made in the previous paragraph also holds with the lenses.

As described on the foregoing pages, the area sensor of the invention comprises basically a light emitter having a plurality of light emitting devices that emit rays of light and a light receiver having a plurality of light receiving devices that respectively correspond to the light emitting devices for receiving the rays of light therefrom and is characterized in that the device providing at least one of the optical axes formed by sets of the light emitting devices and the corresponding light receiving devices is adapted to have narrower angular characteristics than the devices providing the other optical axes. With this arrangement, the optical axes of the light emitter can be positively matched with those of the light receiver by ensuring a match for the optical axis of narrow angular characteristics in the area sensor. On the other hand, the other optical axes have sufficiently wide angular characteristics so that there is no possibility that the overall matching operation becomes cumbersome. Hence, the area sensor of the invention is not only convenient to use but also less likely to operate erroneously, thereby ensuring greater safety for the operator when used as a safety device in a pressing machine or the like.

If more than one optical axis having narrow angular characteristics are provided (by the addition of an extension unit), the area sensor is furnished with a plurality of optical axes having narrow angular characteristics so that even the optical offset resulting from the rotation of the light emitter and the light receiver as they are kept in parallel plane to each other can be eliminated to ensure the correct matching of optical axes. Also in this case, the other optical axes have sufficiently wide angular characteristics so that there is no possibility that the overall matching operation becomes cumbersome.

What is claimed is:

1. An area sensor comprising:
   a light emitter having a plurality of light emitting devices that emit rays of light; and
   a light receiver having light receiving devices that respectively correspond to said light emitting devices for receiving the rays of light therefrom,
   wherein the light emitting device and/or the light receiving device that provides at least one of optical axes formed by sets of said light emitting devices and said light receiving devices corresponding thereto is adapted to have narrower angular characteristics than the light emitting devices and/or the light receiving devices that provide the other optical axes.

2. The area sensor according to claim 1, wherein each of said light emitting devices has a light emitting diode and the light emitting diode in said light emitting device having the narrower angular characteristics has a smaller emission diameter than the light emitting diodes in the other light emitting devices and/or wherein each of said light receiving devices has an optoelectronic semiconductor light receiving device and the optoelectronic semiconductor light receiving device in said light receiving device having the narrower angular characteristics has a smaller reception diameter than the optoelectronic semiconductor light receiving devices in the other light receiving devices.

3. The area sensor according to claim 1, wherein each of said light emitting devices has a light emitting diode and a lens and/or each of said light receiving devices has an optoelectronic semiconductor light receiving device and a lens, the lens in said light emitting or receiving device having the narrower angular characteristics has a narrower luminous intensity distribution characteristic than the lenses in the other light emitting or receiving devices.

4. The area sensor according to claim 3, wherein said lens having the narrower luminous intensity distribution characteristic is realized by changing a lens diameter.

5. The area sensor according to claim 3, wherein said lens having the narrower luminous intensity distribution characteristic is realized by changing a focal length.

6. The area sensor according to claim 3, wherein a plate with a slit hole is interposed between said lens and said optoelectronic semiconductor light receiving device and different angular characteristics are produced by changing a diameter of the slit hole.

7. The area sensor according to claim 1, wherein two optical axes having the narrower angular characteristics are provided in remote positions in the neighborhood of both ends of the area sensor in the direction in which the optical axes are arranged in a row.

8. The area sensor according to claim 1, wherein said light emitter includes a base unit having a plurality of light emitting devices that emit rays of light and an extension unit connectable to said base unit, and said light receiver includes a base unit having light receiving devices that respectively correspond to said light emitting devices for receiving the rays of light therefrom and an extension unit connectable to said base unit.

9. The area sensor according to claim 8, wherein said optical axis having the narrower angular characteristics is located in at least said base units.

10. The area sensor according to claim 9, wherein said optical axis having the narrower angular characteristics is located at the same position in each of said base units and said extension units.

11. An area sensor comprising:

a light emitter having a plurality of light emitting diodes; and a light receiver having optoelectronic semiconductor light receiving devices that respectively correspond to said light emitting diodes for receiving rays of light therefrom, wherein said light emitting diodes and/or said optoelectronic semiconductor light receiving devices have such optical characteristics as to produce elliptical beam spots and the light emitting diode and/or the optoelectronic semiconductor light receiving device that provides at least one of optical axes formed by sets of said light emitting diodes and said optoelectronic semiconductor light receiving devices corresponding thereto is adapted to be such that a major axis of the elliptical beam spot produced with said light emitting diode and/or said optoelectronic semiconductor light receiving device is aligned with a direction in which the optical axes are arranged in a row whereas the light emitting diodes and/or the optoelectronic semiconductor light receiving devices that provide the other optical axes are adapted to be such that minor axes of the elliptical beam spots produced with said light emitting diodes and/or said optoelectronic semiconductor light receiving devices are aligned with the direction in which the optical axes are arranged in a row.

12. The area sensor according to claim 11, wherein two optical axes having the narrower angular characteristics are provided in remote positions in the neighborhood of both ends of the area sensor in the direction in which the optical axes are arranged in a row.

13. The area sensor according to claim 11, wherein said light emitter includes a base unit having a plurality of light emitting devices that emit rays of light and an extension unit connectable to said base unit, and said light receiver includes a base unit having light receiving devices that respectively correspond to said light emitting devices for receiving the rays of light therefrom and an extension unit connectable to said base unit.

14. The area sensor according to claim 13, wherein said optical axis having the narrower angular characteristics is located in at least said base units.

15. The area sensor according to claim 14, wherein said optical axis having the narrower angular characteristics is located at the same position in each of said base units and said extension units.

\* \* \* \* \*